L. P. COULTER.
WELDING CONTROLLER.
APPLICATION FILED JULY 8, 1915.
1,215,914.
Patented Feb. 13, 1917.
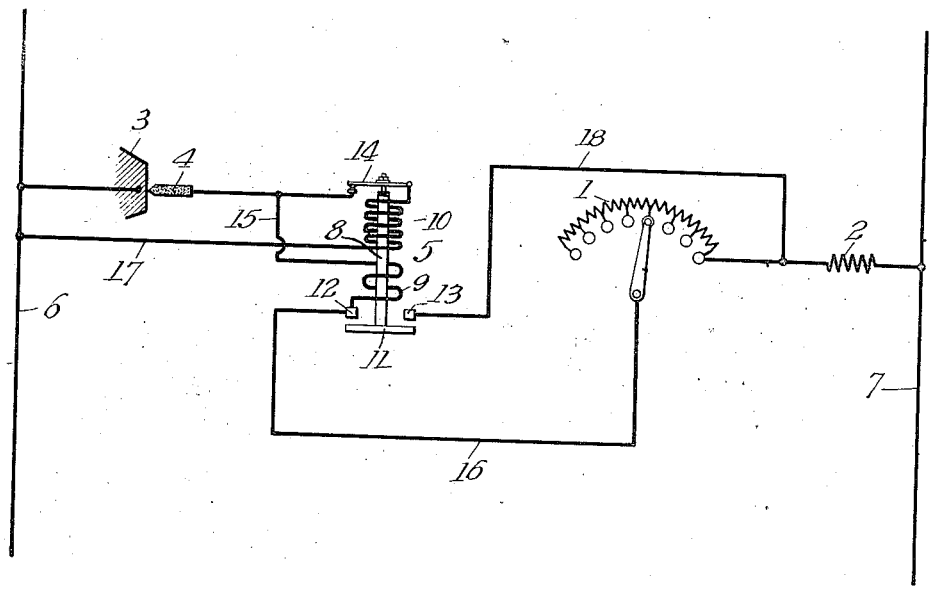
Witnesses:
Robert H. Weir
Arthur W. Carlson
Inventor
Leonard P. Coulter
By Edwin B. H. Tower Jr.
Atty.

UNITED STATES PATENT OFFICE.

LEONARD P. COULTER, OF MILWAUKEE, WISCONSIN, ASSIGNOR TO THE CUTLER-HAMMER MFG. CO., OF MILWAUKEE, WISCONSIN, A CORPORATION OF WISCONSIN.

WELDING-CONTROLLER.

1,215,914.   Specification of Letters Patent.   Patented Feb. 13, 1917.

Application filed July 8, 1915. Serial No. 38,684.

*To all whom it may concern:*

Be it known that I, LEONARD P. COULTER, a citizen of the United States, residing at Milwaukee, in the county of Milwaukee and State of Wisconsin, have invented new and useful Improvements in Welding-Controllers, of which the following is a specification.

This invention relates to welding controllers.

Various controllers have been devised for regulating the current supplied to electrodes used in electric welding. These controllers generally include a resistance for limiting the welding current and switches or other means for controlling the resistance. It is important that the controller automatically return to its initial position when the welding circuit is broken so that the circuit will always be in safe condition for operation. The problem has been to devise a controller which will positively accomplish these and other results with the fewest number of simple devices. To this end the present invention has been devised.

One of the objects of the invention is to provide an improved welding controller which will automatically regulate the welding current in response to the voltage between the yelding electrodes and which will insure that the welding circuit is always in safe condition for operation.

Another object is to provide a simplified welding controller which will automatically exclude a resistance from the welding circuit in response to the voltage between the welding electrodes and insure that the resistance is automatically reinserted when the welding circuit is broken.

A further object is to provide an improved controller in which a single instrumentality automatically controls the welding current in response to the voltage between the welding electrodes and insures that the welding circuit is always in condition for safe operation.

Other objects and advantages of the invention will hereinafter appear.

The accompanying drawing is a diagrammatic view of a controller embodying the invention.

The controller comprises in general a starting resistance 1 and a limiting resistance 2 for regulating the current through the electrodes 3 and 4, and an automatic switch 5 for controlling the starting resistance.

The starting resistance is of any suitable type. It is preferably adjustable as shown so that the amount of resistance in circuit may be varied, and it is normally connected in series with electrodes 3 and 4 across supply mains 6 and 7. The starting resistance is thus initially in the welding circuit so that when the resistance between the electrodes is small, an excessive current will not flow. The resistance is excluded from the circuit by the automatic switch 5, as will be hereinafter described.

The resistance 2, which is called the limiting resistance, is always in the circuit of the electrodes, and it thereby prevents an absolute short-circuit between the supply mains through the controller. The resistances of such a value that sufficient current will flow for welding purposes.

The automatic switch 5 has a reciprocating plunger 8 controlled by two windings 9 and 10, which act cumulatively thereon. The plunger carries a contact bridge 11 adapted to engage the stationary contacts 12 and 13. It is normally biased to open position by gravity or by suitable means such as a spring. The upper end of the plunger 8 is connected to an auxiliary switch member 14 by means of a suitable lost motion connection which is adjusted so that the circuit of winding 10 is opened as the switch 5 closes. The winding 9 of the switch is connected in series in the welding circuit as follows: from positive line 6 through electrodes 3 and 4, conductor 15, winding 9, contact 12, conductor 16 and resistances 1 and 2 to negative line 7. The winding 9 is accordingly energized when the welding circuit is completed and it exerts a pull on the plunger in a direction to close the switch. The winding is arranged, however, so that its pull on the plunger 8 is insufficient to move the switch to closed position, but is sufficient to hold the switch closed after the plunger has been moved by other means.

The winding 10, which may be termed a voltage winding, is connected in shunt to the electrodes 3 and 4. The circuit of this winding is from positive line 6 through the electrodes 3 and 4, switch 14, winding 10, conductor 17 to positive line 6. When the winding 10 is energized, it exerts a pull on the plunger 8 which together with the pull of winding 9 is sufficient to move the switch to closed position.

It should be understood that any other suitable form of switch controlled by two windings acting cumulatively may be used if desired.

The controller is shown in normal position with the switch 5 open. The operation is as follows:

When the electrodes 3 and 4 are separated and the resistance of the arc increases, the voltage drop thereacross correspondingly increases, thereby causing the current through winding 10 to increase. As the current in winding 10 increases, its increasing pull is added to the relatively small pull of winding 9 until a point is reached where the combined pull of the two windings closes the switch. As the switch 5 closes the upper end of the plunger operates the switch 14 and opens the circuit of winding 10, but the switch does not return to its normally open position since the pull of winding 9 is sufficient to hold it closed.

When the switch 5 closes it completes a circuit in shunt to the resistance 1 as follows: from positive line 6 through electrodes 3 and 4, conductor 15, winding 9, contact 12, bridge 11, contact 13, conductor 18 and resistance 2 to negative line 7. The winding 9 thus remains in the welding circuit and holds the switch 5 closed.

When the welding circuit is broken the winding 9 is deënergized and the switch plunger 8 returns to normal position, thereby automatically reinserting the resistance 1 in the welding circuit. The circuit of winding 10 is also automatically closed as the switch 5 returns to its open position. The controller thus automatically returns to its normal position when the welding circuit is broken and reinserts the resistance to protect the circuit.

One of the advantages of the controller is that the switch is held closed by a winding which is deënergized when the welding circuit is broken. This condition would not be present if the voltage winding were employed to hold the switch closed since if the circuit of this winding were not opened it would be connected across the line and the switch would be held closed after being operated, even though the circuit were broken by the welding electrodes. By the novel construction herein disclosed a controller is provided which will automatically control the welding current and at the same time place the controller in normal condition whenever the welding circuit is broken. The operation of the switch is delayed until the resistance of the arc has increased. When the resistance of the arc has increased to a predetermined value, the switch closes, whereupon the circuit of the operating winding is opened and the switch is held closed by a winding which is deënergized whenever the welding circuit is broken so that the switch will return to open position to reinsert the resistance.

Another advantage of the controller is that both the windings act in the same direction on the movable member of the switch and accordingly there is no tendency for said member to vibrate or chatter during the operation of the switch.

It should be understood that the controller shown is for purposes of illustration only, and that other structures may be devised which embody the invention and which are included within the spirit and scope of the appended claims.

What I claim as new and desire to secure by Letters Patent is:

1. A welding controller having a resistance in the circuit of the electrodes, a switch having two windings acting cumulatively to close the switch to exclude the resistance when the resistance of the arc has reached a predetermined value, said switch being adapted to automatically reinsert the resistance when the welding circuit is broken.

2. A welding controller having a starting resistance in the circuit of the electrodes, a switch having two windings acting cumulatively to close the switch to exclude the starting resistance when the resistance of the arc has reached a predetermined value, and means operated by closure of the switch for opening the circuit of one of the windings so that the switch will automatically open to reinsert the resistance when the welding circuit is broken.

3. A welding controller having a starting resistance in the circuit of the electrodes, a switch having a winding responsive to the voltage between the electrodes and a winding responsive directly to the current in the welding circuit, said windings acting cumulatively on the switch to close it to exclude the starting resistance when the resistance of the arc reaches a predetermined value, and means operated by closure of the switch for opening the circuit of the voltage winding so that the switch automatically opens to reinsert the resistance when the welding circuit is broken.

4. A welding controller having a resistance in the circuit of the electrodes, a switch having two controlling windings one of which is responsive to the voltage between the electrodes and the other of which is responsive to the welding current, and means operated by the closure of the switch for opening the circuit of the voltage winding so that the switch will automatically return to open position to reinsert the resistance when the welding circuit is broken.

5. A welding controller having a resistance in the circuit of the electrodes, a switch having two controlling windings one of which is responsive to the voltage between the electrodes and the other of which is responsive to the welding current, said switch being adapted upon closure thereof to open the circuit of the voltage winding and complete a circuit for the other winding and the electrodes in shunt to the starting resistance.

6. A welding controller provided with a switch having two windings acting cumulatively thereon, one of said windings being connected in series with the welding electrodes and with a starting resistance in the welding circuit, the other of said windings being adapted, when the resistance of the arc has reached a predetermined value, to close the switch to complete a circuit from the welding electrode through the one switch winding in shunt to the starting resistance, and means operated by closure of the switch for opening the circuit of the other winding so that the switch will return to normal position when the welding circuit is broken.

In witness whereof, I have hereunto subscribed my name in the presence of two witnesses.

LEONARD P. COULTER.

Witnesses:
L. C. SCHANTZ,
L. D. MASON.